Oct. 20, 1953  K. W. JERNSTROM  2,655,889
HATCH COVER
Filed May 19, 1948  5 Sheets-Sheet 2
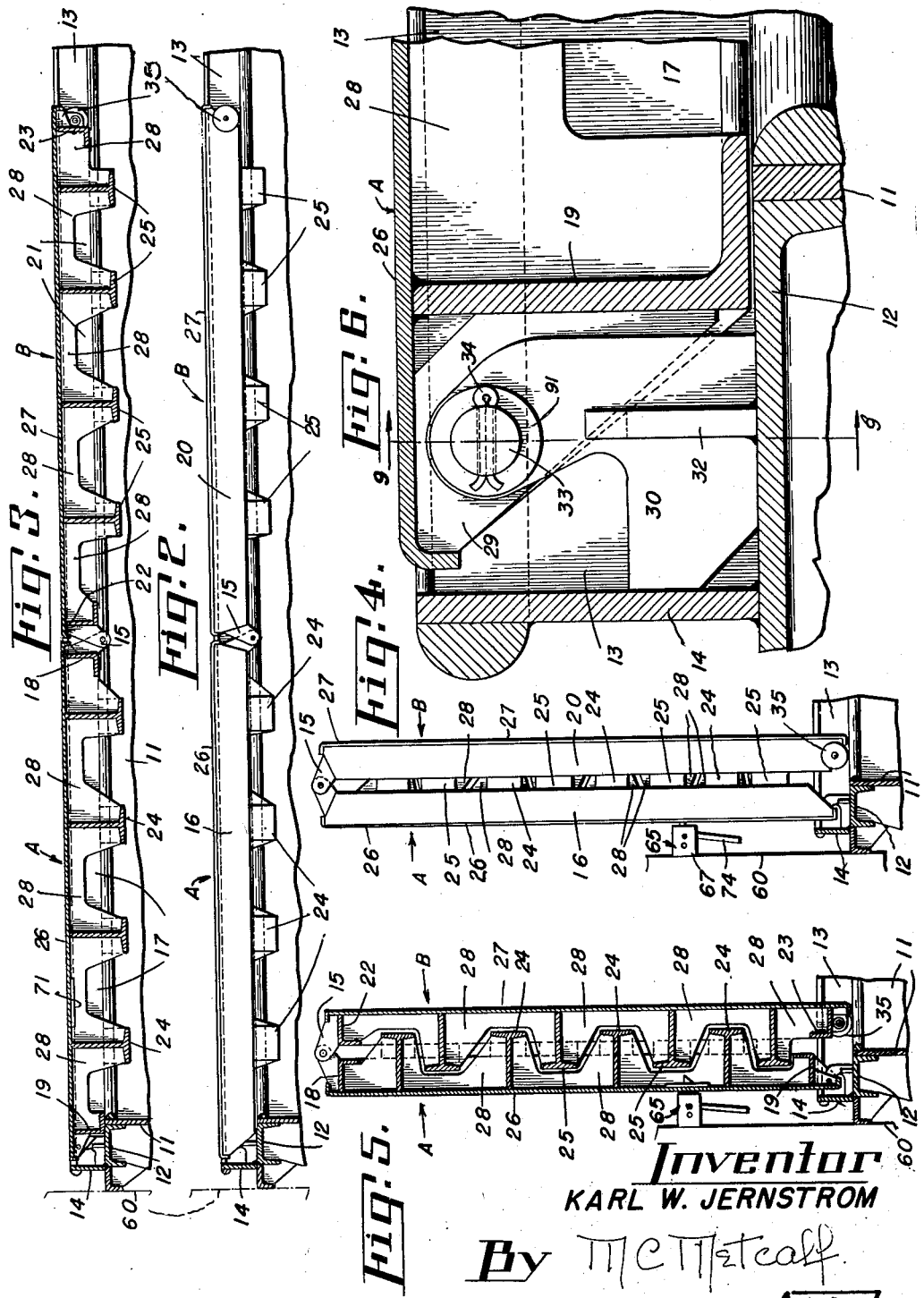
Inventor
KARL W. JERNSTROM
By M C Metcalf
Agent Oct. 20, 1953 K. W. JERNSTROM 2,655,889
HATCH COVER
Filed May 19, 1948 5 Sheets-Sheet 3

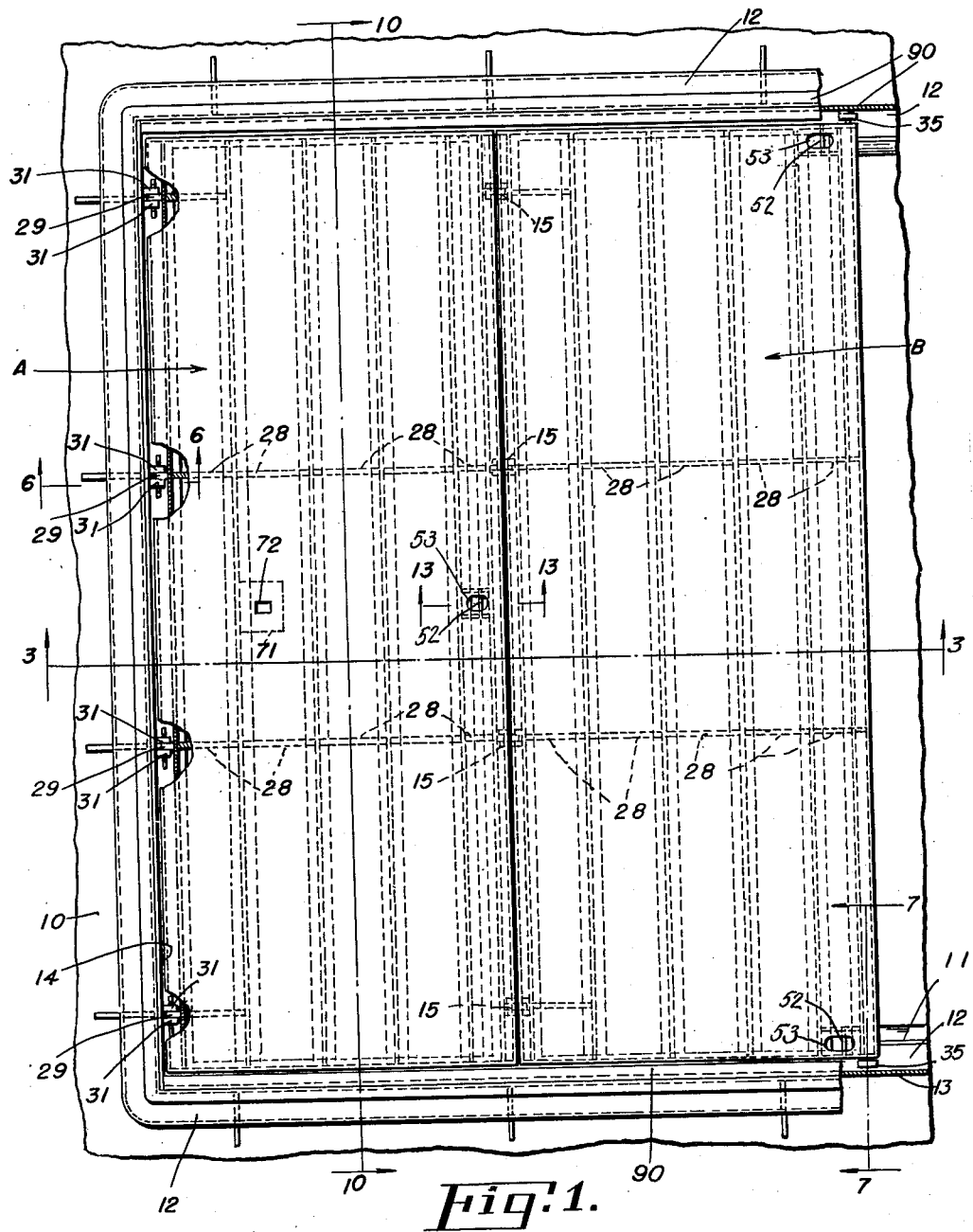

Inventor
KARL W. JERNSTROM
By M C Metcalf
Agent

Oct. 20, 1953 K. W. JERNSTROM 2,655,889
HATCH COVER
Filed May 19, 1948 5 Sheets-Sheet 4
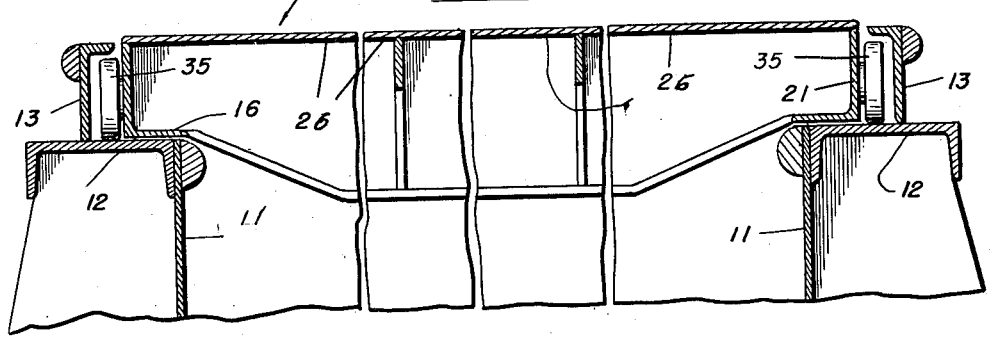
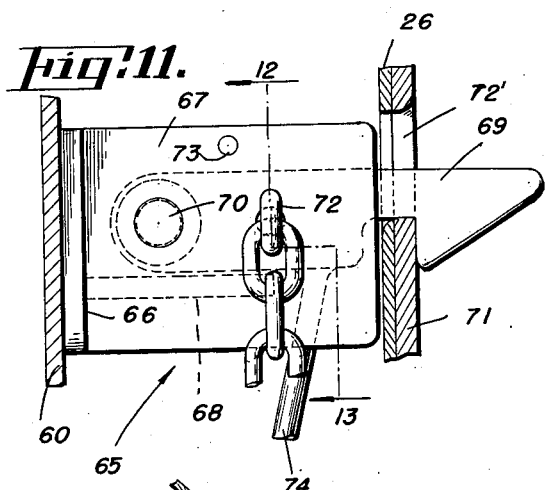
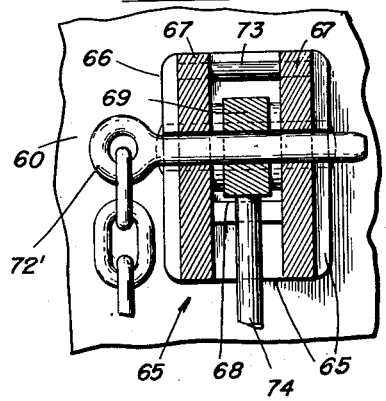
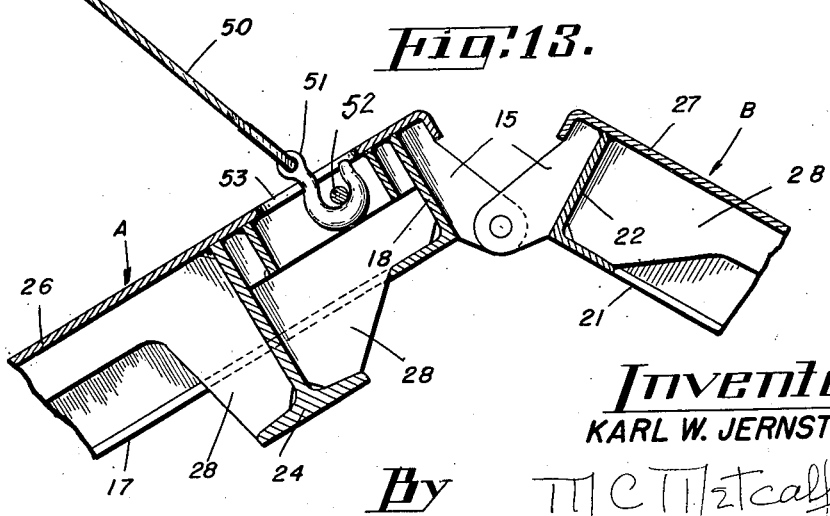
Inventor
KARL W. JERNSTROM
By MCMetcalf
Agent

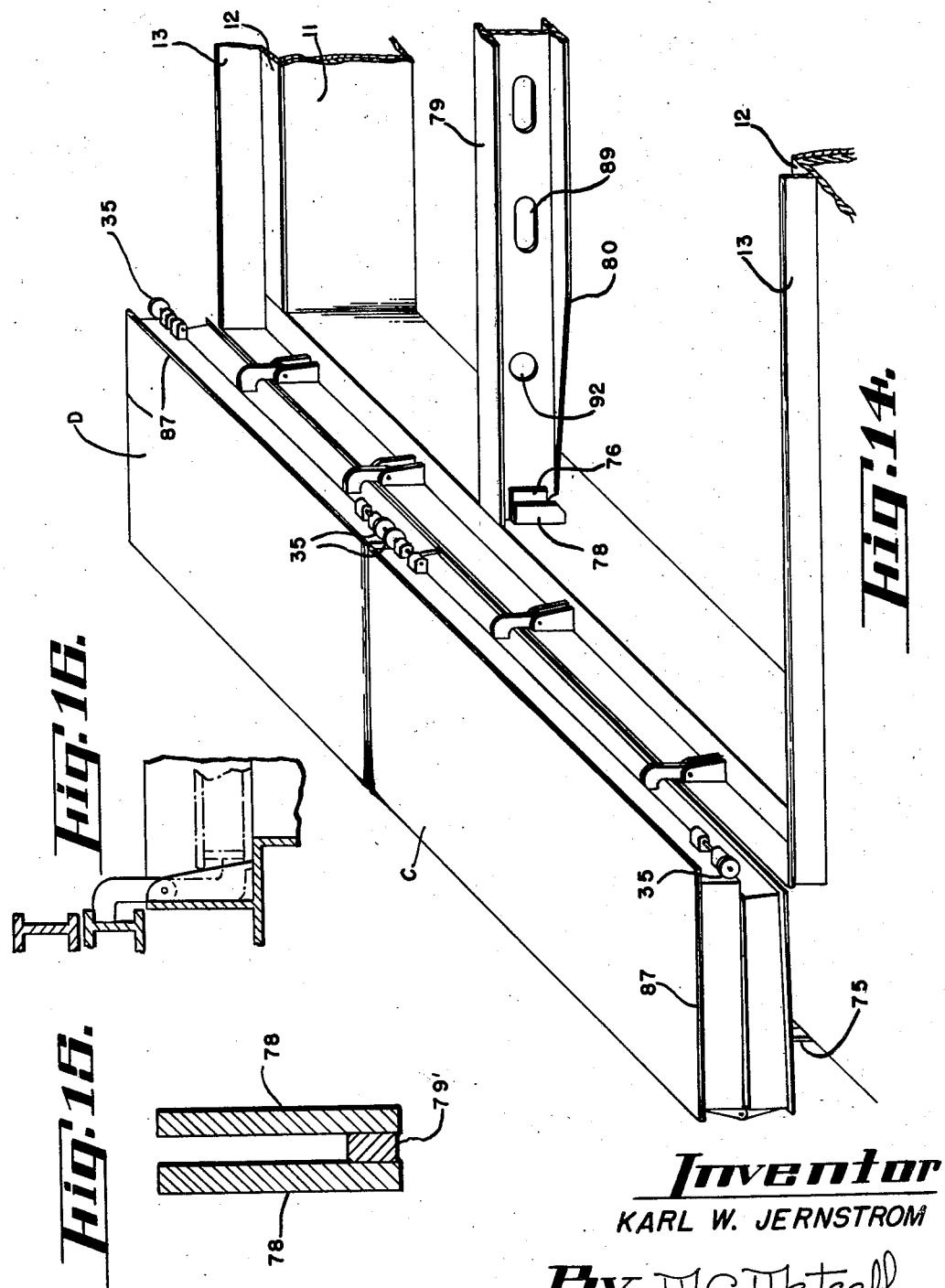

Patented Oct. 20, 1953

2,655,889

UNITED STATES PATENT OFFICE 2,655,889

HATCH COVER

Karl W. Jernstrom, Verona, N. J., assignor to Seaboard Machinery Corporation, New York, N. Y., a corporation of New York Application May 19, 1948, Serial No. 27,981

2 Claims. (Cl. 114—202)

This invention relates to the shipping industry and more particularly to an improved cover for ships' cargo hatches.

It has heretofore been customary to close cargo hatches by placing a number of wooden or metal planks side by side across the hatch and covering them with tarpaulin which is then lashed down. In order to open the hatch to load or unload cargo, it is necessary to unlash and remove the tarpaulin and take off the planks one by one. On a large ship the opening and closing of a hatch may require several hours and considerable labor. Moreover, the planks must be stacked on the deck, taking up valuable space, and hindering the loading and unloading. The maintenance of a large ship in port is very costly and any steps which can be taken to reduce loading and unloading time aid materially in economical operation.

Accordingly the principal object of this invention is to provide a hatch cover which may be fully opened in only a few minutes, by means of the ship's cargo handling gear. To this end, the invention contemplates a cover made of two or more sections depending on the size of the hatch. One section is hinged to the other which is in turn hinged to the hatch coaming or frame. The cover is raised to the open position by hooks attached to the ship's hoisting gear. The hinged sections are designed to fold into a small space either in the vertical position or flat alongside the hatch. Provision may be made for locking the sections in the open position. On large hatches in order to keep the weight of the cover units down and facilitate handling, the cover may be divided into several hinged assemblies and a portable intermediate supporting beam may be employed. When the cover is folded back, such beams are removed leaving the entire hatch opening clear during loading operations.

Other objects are to provide a hatch cover which requires a minimum of force to open and close, which is substantially watertight in itself and does not require further covering under mild weather conditions, and which is permanently attached to the hatch, but folds entirely out of the way of the hatch opening and occupies a minimum of space when folded.

These and other objects, advantages and novel features incorporated in the design of this improved hatch cover will be more apparent from the following description.

In the drawings illustrating the preferred embodiment of the invention:

Fig. 1 is a plan view of one of the cover units mounted on a hatch, the top plate of the cover being broken away to show the hinges which attach the cover to the hatch frame. Other parts of the hatch and weather deck are broken away;

Fig. 2 is a side elevation of a hatch cover unit. Parts of the hatch coaming structure to which the cover is hinged have been shown in cross-section and other parts broken away for convenience;

Fig. 3 is a cross-section taken on the line 3—3 of Fig. 1 showing the cover in the closed position;

Fig. 4 is a side elevation similar to that shown in Fig. 2, but with the hatch cover in the vertical open position;

Fig. 5 is a cross-section similar to Fig. 3, but showing the cover in the vertical open position as in Fig. 4;

Fig. 6 is a fragmentary partial cross-section and elevation taken at the position indicated by the line 6—6 of Fig. 1 particularly showing one of the hinges connecting the hatch cover to the hatch coaming structure;

Fig. 10 is a fragmentary cross-section taken on line 10—10 of Fig. 1, particularly illustrating the mid-cover construction;

Fig. 11 is a side elevation of a latching unit adapted to hold the hatch cover in the vertical open position. The fragmentary cross-sections represent the part of the ship's hatch structure to which the locking unit is attached and the part of the hatch cover through which the latching bar engages.

Fig. 12 is a fragmentary cross-section and elevation taken on the line 12—12 of Fig. 11 particularly showing the toggle pin for locking the latching unit;

Fig. 13 is a fragmentary cross-section and elevation taken at a position indicated by the line 13—13 on Fig. 1, but showing the hatch cover being raised or lowered, and particularly illustrating the hinge connecting the two halves of the hatch cover together and the lifting pin for attaching the ship's hoisting gear;

Fig. 14 is an isometric view of one side of a hatch with two folded cover units, showing a cover and track arrangement suitable for very large hatches;

Fig. 15 is a detail elevation of the carrier for the removable beam; and

Fig. 16 is an enlarged fragmentary cross-section of an end of the hatch showing the hatch cover in the closed position in dot-dash lines.

Figure 7:
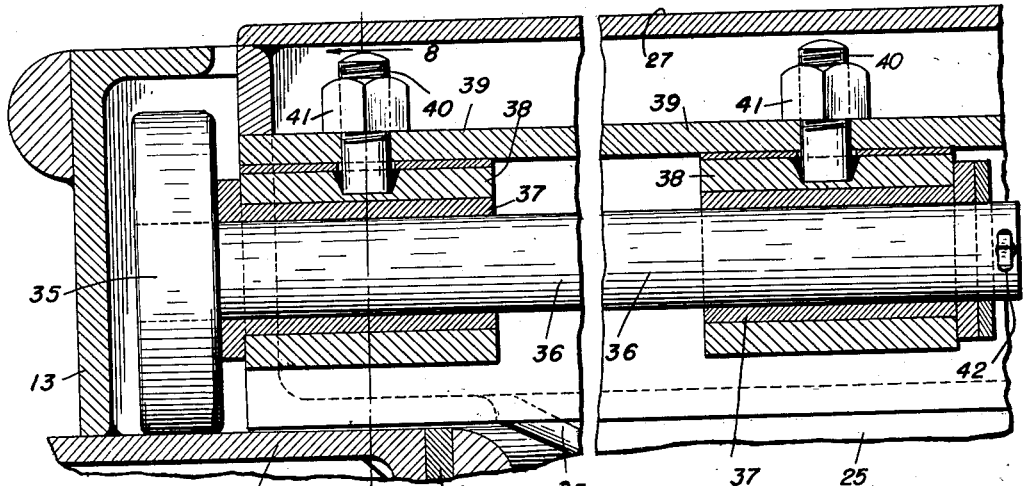
Fig. 7 is another fragmentary partial cross-section and elevation taken on the line 7—7 of Fig. 1, showing one of the rollers on which the free end of the cover rolls when the cover is being raised or lowered.

Referring more in detail to the drawings and particularly to Figs. 4 and 5, a typical hatch structure is shown comprising side walls 11 protruding through the opening in deck 10 and reinforced above the deck by inverted channels 12. Guide rails 13, shown in section in Fig. 10 are welded along the sides of the hatch and plates 14 (Fig. 5) across the ends to provide a continuous raised rim around into which the cover fits when closed. The right end of the hatch (not shown) is similar in construction to the left.

The hatch cover is here shown as an assembly consisting of two sections A and B which are hinged together by means of several hinges 15, as indicated in Fig. 1.

A typical arrangement for completely covering the hatch would include a second hinged assembly, in every way similar to the one shown, hinged to the right end of the hatch.

In some installations, two sets of the hatch covers will suffice but on extra long hatches one or more intermediate covers, usually called pontoon covers, may separate the two hinged units. An alternative arrangement is to hinge several cover assemblies side by side along the longer sides of the hatch as shown in Fig. 14. In this case a removable beam provides support between adjoining cover assemblies. For a very small hatch a single cover hinged to one side of the coaming may be adequate. It is evident that a variety of arrangements may be used.

A and B cover sections are provided with side angle members 16, 17, 18 and 19, and 20, 21, 22 and 23 respectively which when welded together form solid rectangular frames. Between the sides 16 and 17 of cover member A are located transverse inverted T-shaped beams 24 the ends of which are welded at right angles to the angle members 16 and 17. In a similar manner, inverted T-shaped beams 25 are welded to the angle members 20 and 21 of the cover B. The angle irons and beams of covers A and B are welded to top plates 26 and 27 respectively. As shown in Fig. 10, over most of the cover width the flanges of the beam 24 and 25 extend below the bottom flange of the side frame angle irons 16, 17, 18, 19, 20, 21, 22 and 24, and sloping T-beam sections connect the beams at each end to the side frame. Between the inverted T-shaped beams 24 and 25 and in line with the hinge locations are welded stiffener plates 28. The plates 28 are cut back between beams as shown in Figs. 3 and 5. The T beams of adjacent sections are relatively offset or staggered to assure that the beams of one section project into the spaces of the other section when folded as shown in Fig. 5.

Figure 9:
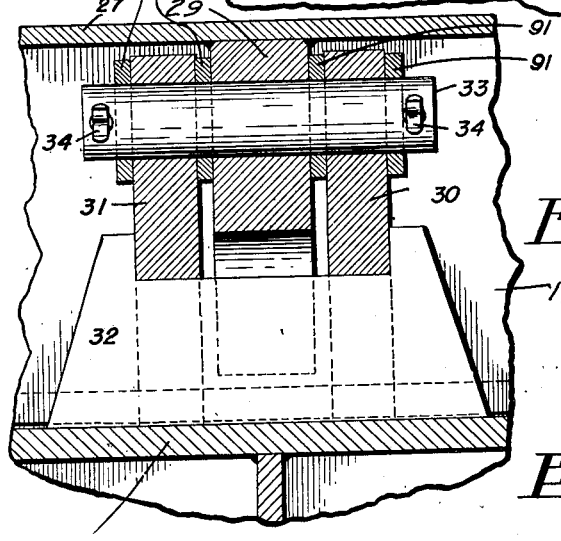
Fig. 9 is a fragmentary partial cross-section taken on the line 9—9 of Fig. 6 particularly showing the construction of the hinge which connects the cover to the hatch coaming structure.

Figs. 6 and 9 illustrate a typical hinge for connecting the cover to the hatch frame. Bracket plate 29 is welded to the top plate 26 and the angle iron frame 19. Welded to the hatch coaming members 12 and 14 is the other part of the hinge comprising the two plates 30 and 31 and bracket plate 32. The plates 30 and 31 are slotted to receive the bracket plate 32 and all three plates are solidly welded together and the unit welded to the members 12 and 14. The two parts of the hinge are fitted together as shown in Fig. 9. Washers 91, preferably of bronze, serve to reduce friction. The hinge assembly is held together by pivot pin 33, held in place by cotter pins 34.

Figure 8:
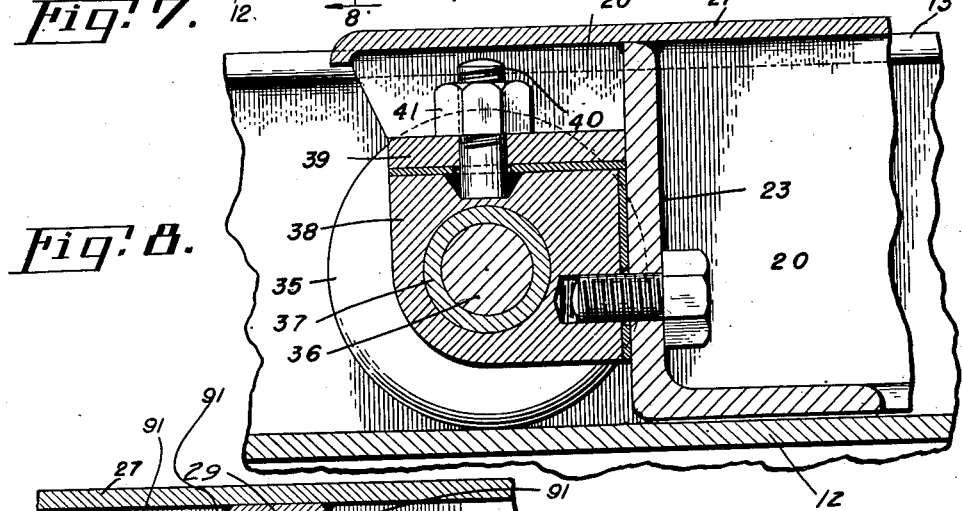
Fig. 8 is a fragmentary partial cross-section taken on the line 8—8 on Fig. 7.

On the free end of the cover are rollers 35 shown in detail in Figs. 7 and 8. The rollers are solidly fixed to the shafts 36. The shafts are journaled in bushings 37 which are fixed in the housing blocks 38. A plate 39 is welded to the side frames 20 and 21, and the plate 27, and receives the studs 40 and the nut 41. A cotter pin 34 maintains the shaft assembly in place.

In Fig. 13 is shown a hatch cover assembly partly raised. A cable 50 controlled by the ship's hoisting gear is provided with a conventional hook 51 which engages a pin 52 transversely mounted in an opening 53 located in the top plate 26. When the cable 50 is raised, the cover section A pivots on the hinges attached to the hatch coaming, and cover section B pivots on hinges 15, as shown in Fig. 13. The rollers 35 mounted on the free end of section B travel along the channel irons 12, as shown in Figs. 4 and 5, until the folded cover unit is in a vertical position. These rollers serve to carry part of the weight and guide the cover during the raising and lowering operation so as to prevent jamming.

Other lifting pins 52 are provided on each corner of the free end of the cover to permit attaching other cables to start lowering. When the cover has been moved slightly out of the vertical position, the weight of the cover will cause the rollers to move along channel irons 12 until the cover reaches the closed position shown in Figs. 2 and 3.

Mounted on any suitable support, as indicated at 60, Figs. 4, 5, and 11 is special locking unit 65 comprising a back plate 66 adapted to be welded to the support 60. Side plates 67 are welded to the plate 66 and are separated by means of the central plate 68 which is welded to the sides 67. A latch bar 69 is pivoted on the pin 70. The free end of latch bar 69 projects outwardly. At a proper position on the under side of the cover A is provided a reinforcing patch 71. An opening 72 is provided through both the cover plate 26 and the reinforcing plate 71. When cover A is in the vertical position, latch bar 69 engages the top plate and patch through opening 72 as shown in Fig. 11. A toggle 72', Fig. 12, may be inserted through the latch bar to lock it in position. A stop 73 is provided through the plates 67 at a point above the latch bar 69 to prevent the bar from being raised too far to permit its entrance through the opening 72 when the hatch cover is raised into a vertical position. To facilitate the removal of the latch bar 69, when it is desired to lower the hatch cover, a hand operating lever 74 is secured to the forward end of the latch bar 69 so that the engaging end of the bar will clear the edge of opening 72.

The ingenious staggered arrangement of T-shaped stiffeners 24 and 25 and the cutouts in plates 28 permit the two cover sections to fold into a minimum of space as shown in Figs. 4 and 5.

In Fig. 14 is illustrated a type of hatch cover arrangement particularly adapted to a long and relatively narrow hatch. Two cover assemblies generally designated as C and D are hinged side by side and fold back flat when open as shown. A cover constructed as shown in Fig. 5 provides a solid platform in this position which may be a convenience during loading.

Cover rests 75 are provided in suitable locations on the hatch frame structure. The top plates of the cover overhang their angle frames and are reinforced by a bead 87 welded on. The overhang covers the tracks when the hatch cover is closed.

To support the cover assemblies D and C in the middle of the hatch, a portable I-beam 79 is provided. A hole 92 is provided through to provide for attaching a lifting cable or chain. Lightening holes 89 may be cut through the web of the beam.

The dotted line position in Fig. 16 shows the hatch cover in the closed position.

The bottom flange and part of the web of the I-beam are cut away at the end and a reinforcing patch 76 is welded to the upper part of the web and the upper flange. This reinforced end of the beam rests in a carrier shown in detail in Fig. 15. The carrier consists of two plates 78 and a block 79 welded thereto. The assembled carrier is welded to the side of the hatch and the beam fits into the slot between plates 78.

Since certain changes may be made in the above described article and different embodiments of the invention could be made without departing from the scope thereof, it is intended that all matter contained in the above description or shown in the accompanying drawings shall be interpreted as illustrative only and not in a limiting sense.

What is claimed:

1. In combination with a hatch opening surrounded by a frame; a pair of hatch covers, each cover comprising two sections hinged together at their adjacent edges, each section comprising a flat cover plate having an unobstructed upper surface and having reinforcing beams fastened to its under side parallel to said hinged edges and so arranged that the beams of one section project into the spaces between the beams on the other section when said sections are folded against each other to form a rectangular-shaped box; a plurality of transverse stiffeners mounted on the under side of said plates between said beams, said stiffeners being cut away to accommodate the beams on the opposite section; hinged connections between the free edge of one of said sections and the end of said hatch frame, said hinged connections being attached to the under side of said section and permitting said section to pivot 180° with respect to said hatch frame to a horizontal position alongside said hatch opening presenting a flat upper surface adjacent said opening thereby providing a working platform, a pair of rollers attached to the free edge of the other of said sections adjacent the corners; a track for one of said rollers along the edge of said hatch opening; and a track for the other of said rollers supported across the hatch opening, said pair of hatch covers being mounted side-by-side along the end of said hatch frame to which said hinged connection is made.

2. Apparatus according to claim 1 wherein said tracks have low central areas and raised areas near the ends connected by sloping areas thereby assuring smooth movement of the cover from the track level to the level of the hatch frame.

KARL W. JERNSTROM.

References Cited in the file of this patent

UNITED STATES PATENTS

| Number | Name | Date |
| --- | --- | --- |
| 1,768,701 | MacGregor | July 1, 1930 |
| 2,093,362 | Nelson | Sept. 14, 1937 |
| 2,119,708 | Greulich | June 7, 1938 |
| 2,256,087 | Hay | Sept. 16, 1941 |
| 2,332,386 | Lemon | Oct. 19, 1943 |
| 2,379,623 | Campbell | July 3, 1945 |
| 2,484,286 | Groppell | Oct. 11, 1949 |

FOREIGN PATENTS

| Number | Country | Date |
| --- | --- | --- |
| 188,095 | Great Britain | Nov. 9, 1922 |
| 370,653 | Great Britain | Apr. 14, 1932 |
| 409,231 | Great Britain | Apr. 26, 1934 |
| 466,019 | Great Britain | May 14, 1937 |